US008828350B2

(12) United States Patent
Stokes

(10) Patent No.: US 8,828,350 B2
(45) Date of Patent: Sep. 9, 2014

(54) GAS RECOVERY OF SULPHUR HEXAFLUORIDE

(75) Inventor: Anthony Stokes, Newport (AU)

(73) Assignee: ABB Technology Ltd., Zurich (CH)

( * ) Notice: Subject to any disclaimer, the term of this patent is extended or adjusted under 35 U.S.C. 154(b) by 694 days.

(21) Appl. No.: 11/597,526

(22) PCT Filed: May 16, 2005

(86) PCT No.: PCT/AU2005/000700
§ 371 (c)(1),
(2), (4) Date: Feb. 8, 2007

(87) PCT Pub. No.: WO2005/119149
PCT Pub. Date: Dec. 15, 2005

(65) Prior Publication Data
US 2009/0041654 A1 Feb. 12, 2009

(30) Foreign Application Priority Data

Jun. 2, 2004 (AU) ................................ 2004902990

(51) Int. Cl.
*C01B 17/45* (2006.01)
*F25J 3/00* (2006.01)

(52) U.S. Cl.
USPC ........................................... 423/469; 62/617

(58) Field of Classification Search
CPC ............ C01B 17/1453; C01B 17/4523; C01B 17/4538; C01B 17/4546; B01J 20/20; F25J 3/08; F25J 220/02; F25J 2215/80; F25J 2270/90; F25J 3/0295
USPC .......................................... 62/45.1; 423/469
See application file for complete search history.

(56) References Cited

U.S. PATENT DOCUMENTS

| 3,656,826 A * | 4/1972 | Fraser et al. ..................... 445/53 |
| 4,227,163 A | 10/1980 | Barnoski |
| 4,274,851 A * | 6/1981 | Stokes ........................... 62/601 |

FOREIGN PATENT DOCUMENTS

| EP | 0 016 881 A1 | 10/1980 |
| JP | 2002-090061 | * 3/2002 |
| JP | 2002 90061 | * 3/2002 |
| JP | 2002-090061 A | 3/2002 |

OTHER PUBLICATIONS

International Search Report dated Jun. 15, 2005.
The International Electrotechnical Commission IEC 60480, "Guide to the checking and treatment of sulphur hexafluoride ($SF_6$) taken from electrical equipment", published Oct. 2004.

* cited by examiner

*Primary Examiner* — Bijay Saha
(74) *Attorney, Agent, or Firm* — Buchanan Ingersoll & Rooney PC

(57) ABSTRACT

A system and method are provided for recovering a re-usable grade of sulphur hexafluoride ($SF_6$) from a potentially contaminated gas source. The system includes extraction vessels connected to the potentially contaminated gas source. A first cryogenic means reduces the temperature of the extraction vessel to a temperature below the phase transition of $SF_6$ causing a pressure differential which causes the potentially contaminated gas to enter the extraction vessels. The $SF_6$ turns to liquid and/or solid form in the extraction vessel. Non-condensed contaminant gas is evacuated from the extraction vessels. Recovery vessels are connected to the extraction vessel. A second cryogenic means is used to reduce the temperature of the recovery vessels. Raising the temperature of the extraction vessels creates a pressure differential which causes a re-usable grade of $SF_6$ to enter the recovery vessels.

34 Claims, 2 Drawing Sheets

GAS RECOVERY OF SULPHUR HEXAFLUORIDE

FIELD OF THE INVENTION

The present invention relates to a system and method for recovering a re-usable grade of sulphur hexafluoride from a potentially contaminated gas source.

BACKGROUND OF THE INVENTION

There are a number of industries wherein equipment is required to operate in an atmosphere of sulphur hexafluoride ($SF_6$) gas. One particular industry is the electrical supply industry. $SF_6$ has very low electric conductivity characteristics which lends itself as being a highly suitable insulating gas for high voltage equipment, for example, electric circuit breakers and transformers. Most equipment manufacturers specify that the equipment must be brought into service using new $SF_6$. Industry standards dictate the level and type of impurities which may be present with $SF_6$ to satisfy the definition of usable $SF_6$.

New $SF_6$ is relatively expensive. Furthermore, $SF_6$ has serious environmental concerns with respect to its potential contribution to the greenhouse effect. These environmental concerns add to the cost of handling $SF_6$ and minimising the release of $SF_6$ to the atmosphere.

The normal handling of $SF_6$ periodically occurs through the life of high voltage equipment. The $SF_6$ gas must be removed from the equipment before the equipment can be serviced, repaired or decommissioned. Such handling can introduce additional contaminants to the $SF_6$, for example, air, oil and water. Therefore, the removed $SF_6$ may fall outside the standard for usable $SF_6$ and will often prevent it from being re-used. Other contaminants may be present in the removed $SF_6$ due to normal use in the equipment, for example, $CF_4$ can be formed by arcing. The International Electrotechnical Commission IEC 60480, "Guide to the checking and treatment of sulphur hexafluoride ($SF_6$) taken from electrical equipment", published October 2004, provides information relating to the likely origin of various types of impurity, as follows:

TABLE 1

Origin of $SF_6$ impurities

| $SF_6$ SITUATION & USE | SOURCE OF IMPURITIES | POSSIBLE IMPURITIES |
| --- | --- | --- |
| During handling and in service | Leaks and incomplete evacuation; Desorption | Air, Oil, $H_2O$ |
| Insulating function only | Partial discharges: Corona and sparking | HF, $SO_2$, $SOF_2$, $SOF_4$, $SO_2F_4$ |
| In switching equipment | Switching arc erosion | $H_2O$, HF, $SO_2$, $SOF_2$, $SOF_4$, $SO_2F_2$, $CuF_2$, $SF_4$, $WO_3$, $CF_4$, $AlF_3$ |
| | Mechanical erosion | Metal dusts, particles |
| Internal arc | Melting & decomposition of materials | Air, $H_2O$, HE, $SO_2$, $SOF_2$, $SOF_4$, $SO_2F_2$, $SF_4$, $CF_4$, Metal dusts, particles $AlF_3$, $FeF_3$, $WO_3$, $CuF_2$ |

IEC 60480 further provides recommended maximum contamination levels that can be present in re-usable $SF_6$, as follows:

TABLE 2

Maximum acceptable impurity levels

| IMPURITY | MAXIMUM ACCEPTABLE LEVELS | |
| --- | --- | --- |
| | Rated absolute pressure <200 kPa | Rated absolute pressure >200 kPa |
| Air and/or $CF_4$ | 3% Volume | 3% Volume |
| $H_2O$ | 95 mg/kg | 25 mg/kg |
| Mineral Oil | 10 mg/kg | |
| Total reactive gaseous decomposition products | 50 μl/l total or 12 μl/l for ($SO_2$ + $SOF_2$) or 25 μl/l HF | |

In gas leak situations, due to the environmental issues, leaked gas is increasingly being contained until it can be removed from containment. However, $SF_6$ is open to substantial contamination during containment. Therefore, $SF_6$ removed from containment may fall way outside the standard for usable $SF_6$.

Known $SF_6$ gas recovery equipment normally utilises high pressure pumps and large storage vessels. The volume of freshly pumped gas into a containment vessel is relatively large. To be effective, the pumps must have a high capacity. However, high capacity pumps of the kind suitable for handling $SF_6$ are cumbersome and expensive equipment. Such pumps must be protected from chemical attack by some of the decomposition products of $SF_6$ and the gas stream must be filtered and purified before the gas enters the pumps. Furthermore, $SF_6$ gas recovery tends to take a substantial amount of time which is undesirable, especially in gas leak situations.

U.S. Pat. No. 4,274,851, by the present inventor, discloses an apparatus for recovering gas from high voltage equipment using cryogenic pumping. The cryogenic pumping was found to be an efficient alternative to high capacity pump equipment. However, the disclosure does not teach how to produce a sufficiently pure form of $SF_6$ for re-use.

It is an object of the present invention to provide a system and method for recovering a re-usable grade of $SF_6$, said re-usable grade of $SF_6$ being of a purity standard satisfying IEC 60480. It is a further object to provide a means of rapidly extracting $SF_6$ from electrical equipment, for example, using facilities that are not sensitive to chemical attack by $SF_6$ decomposition products and that allow subsequent purification at a later time and place. It is a further object to provide $SF_6$ recovery without the need for high capacity pump equipment.

SUMMARY OF THE INVENTION

According to a first aspect of the present invention there is provided a system for recovering a re-usable grade of sulphur hexafluoride from a potentially contaminated gas source including sulphur hexafluoride, said system including:

at least one extraction vessel including a gas inlet and a gas outlet, said gas inlet being adapted to be connected to said potentially contaminated gas source;

a first cryogenic means for reducing the temperature of said at least one extraction vessel to a temperature below phase transition of sulphur hexafluoride gas, wherein at said cryogenically reduced temperature the pressure in said at least one extraction vessel is less than the potentially contaminated gas source pressure thereby causing said potentially contaminated gas to enter said at least one vessel via said gas inlet, the sulphur hexafluoride included in said potentially contaminated gas turning into liquid and/or solid form in said at least one extraction vessel;

evacuation means for evacuating any non-condensed contaminant gas from said at least one extraction vessel via said gas outlet while said at least one extraction vessel is at said cryogenically reduced temperature;

means for raising the temperature of said at least one extraction vessel from said cryogenically reduced temperature to substantially a dewpoint temperature after evacuating said non-condensed gas, wherein at said dewpoint temperature a re-usable grade of sulphur hexafluoride gas is present in said at least one extraction vessel and any condensable contaminants are in liquid and/or solid form, and wherein raising the temperature substantially to the dewpoint temperature raises the pressure in the at least one extraction vessel;

at least one recovery vessel including a gas inlet being adapted to be connected to said gas outlet of said at least one extraction vessel; and a second cryogenic means for reducing the temperature of said at least one recovery vessel to a temperature below phase transition of sulphur hexafluoride, wherein at said cryogenically reduced temperature the pressure in said at least one recovery vessel is less than the pressure in said at least one extraction vessel when substantially at said dewpoint temperature, wherein connecting the gas inlet of said at least one recovery vessel to the gas outlet of said at least one extraction vessel allows said re-usable grade of sulphur hexafluoride to enter said at least one recovery vessel.

According to a second aspect of the present invention there is provided a method for recovering a re-usable grade of sulphur hexafluoride from a potentially contaminated gas source including sulphur hexafluoride, said method including the steps of:

cryogenically reducing the temperature of at least one extraction vessel to a temperature below phase transition of sulphur hexafluoride gas, wherein at said cryogenically reduced temperature the pressure in said at least one extraction vessel is less than the potentially contaminated gas source pressure;

fluidly connecting said at least one extraction vessel with the potentially contaminated gas source and allowing said potentially contaminated gas to enter said at least one extraction vessel due to the pressure difference between the at least one extraction vessel and the potentially contaminated gas source, the sulphur hexafluoride included in said potentially contaminated gas turning into liquid and/or solid form in said at least one extraction vessel;

evacuating any non-condensed contaminant gas from said at least one extraction vessel while said at least one extraction vessel is at said cryogenically reduced temperature;

raising the temperature of said at least one extraction vessel from said cryogenically reduced temperature to substantially a dewpoint temperature, wherein at said dewpoint temperature a re-usable grade of sulphur hexafluoride gas is present in said at least one extraction vessel and any condensable contaminants are in liquid and/or solid form, and wherein raising the temperature substantially to the dewpoint temperature raises the pressure in the at least one extraction vessel;

cryogenically reducing the temperature of at least one recovery vessel to a temperature below phase transition of sulphur hexafluoride gas, wherein at said cryogenically reduced temperature the pressure in said at least one recovery vessel is less than the pressure in said at least one extraction vessel when substantially at said dewpoint temperature; and fluidly connecting said at least one recovery vessel with the at least one extraction vessel and allowing said re-usable grade of sulphur hexafluoride gas to enter said at least one recovery vessel due to the pressure difference between the at least one recovery vessel and the at least one extraction vessel.

The present invention advantageously provides for the efficient recovery of $SF_6$ at a re-usable grade. The invention can be conveniently embodied using a modular arrangement of equipment which can be assembled on-site. Recovered $SF_6$ can be conveniently stored for later use.

BRIEF DESCRIPTION OF THE DRAWINGS

Further features and aspects of the present invention will become apparent from the following description of preferred embodiments given in relation to the accompanying drawings, in which.

DESCRIPTION OF PREFERRED EMBODIMENT

According to preferred embodiments of the present invention, a system is provided for recovering a re-usable grade of $SF_6$ from a potentially contaminated gas source. The system uses two cryogenic pumping steps. The first cryogenic pumping step extracts the potentially contaminated gas from its source. The source may be a piece of equipment which operates in an atmosphere of $SF_6$, e.g. a high voltage circuit breaker or transformer, or the source may be a contained volume of leaked $SF_6$. The second cryogenic pumping step is used to recover a re-usable grade of $SF_6$.

Figure 1:
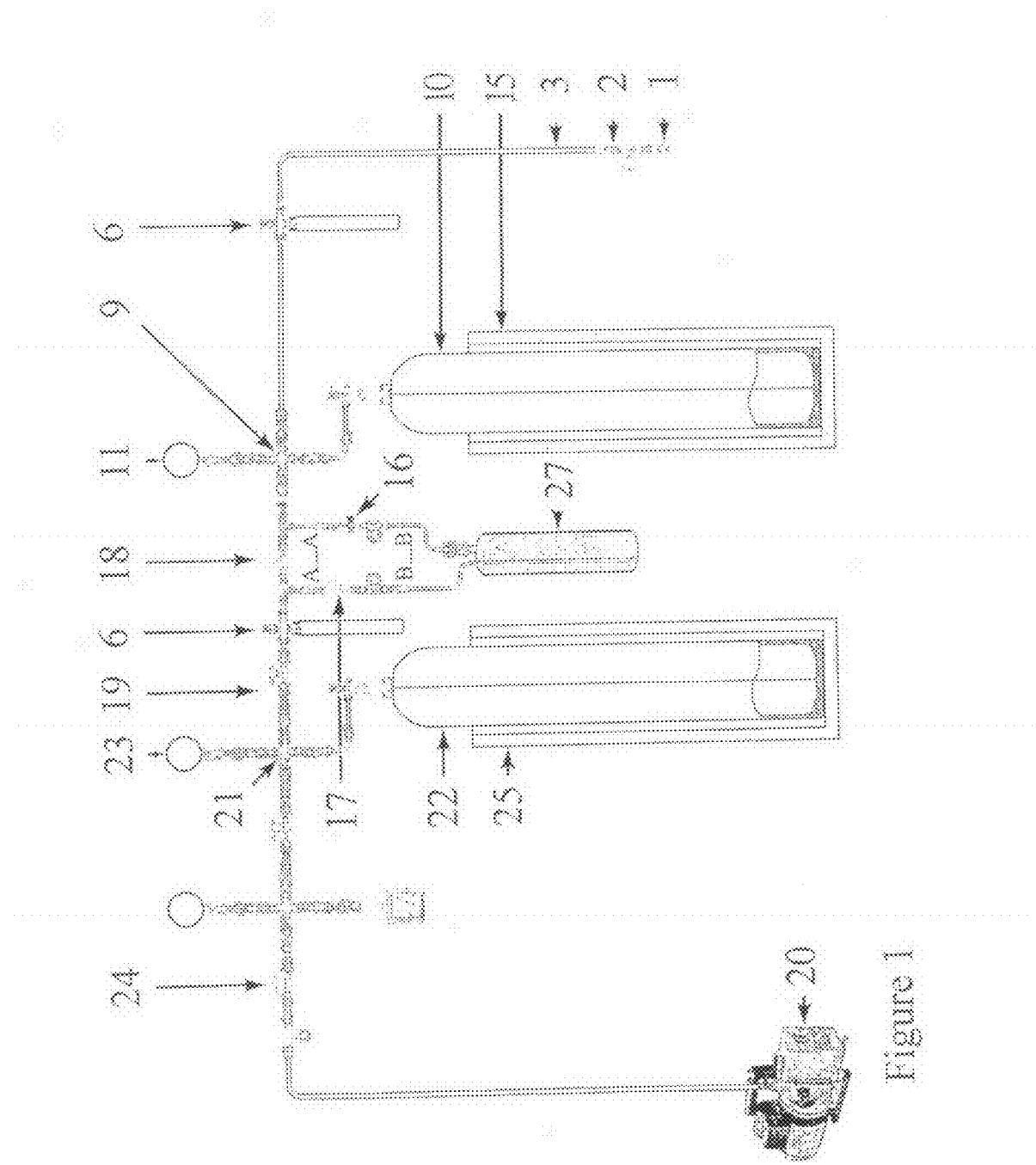
FIG. 1 is a schematic diagram of a system according to a preferred embodiment of the present invention.

FIG. 1 shows a preferred embodiment of the recovery system. The system consists of a number of modular components which are readily assembled when the system is required and disassembled when the system is not needed. Having the system in a number of modular components provides ease of storage when the system is not required, which means that such a system could be readily kept on-site. However, it will be appreciated that a fixed installation is equally possible.

The system gas inlet 1 is shown with a fitting that is suitable for connection to a gas outlet of $SF_6$ housed electrical equipment. The inlet 1 includes a regulating valve 2 for isolating purposes and is attached to a flexible hose 3.

The hose 3 is shown connected to a sampling module 6, which includes a valve and a sample cylinder. During the first cryogenic pumping step, a sample of extracted gas may be obtained by opening the sample cylinder valve and closing all other valves except valve 2. When the sample has been obtained, the sample cylinder valve can be closed and the potentially contaminated gas allowed to flow directly to the extraction module 9. The sealed sample cylinder 6 can be disconnected at a later stage once the gas extraction is completed.

If sampling at the inlet to the system is not a required step, then the system can be assembled without the sampling module 6. The hose 3 could be connected directly with the extraction module 9.

Figure 2:
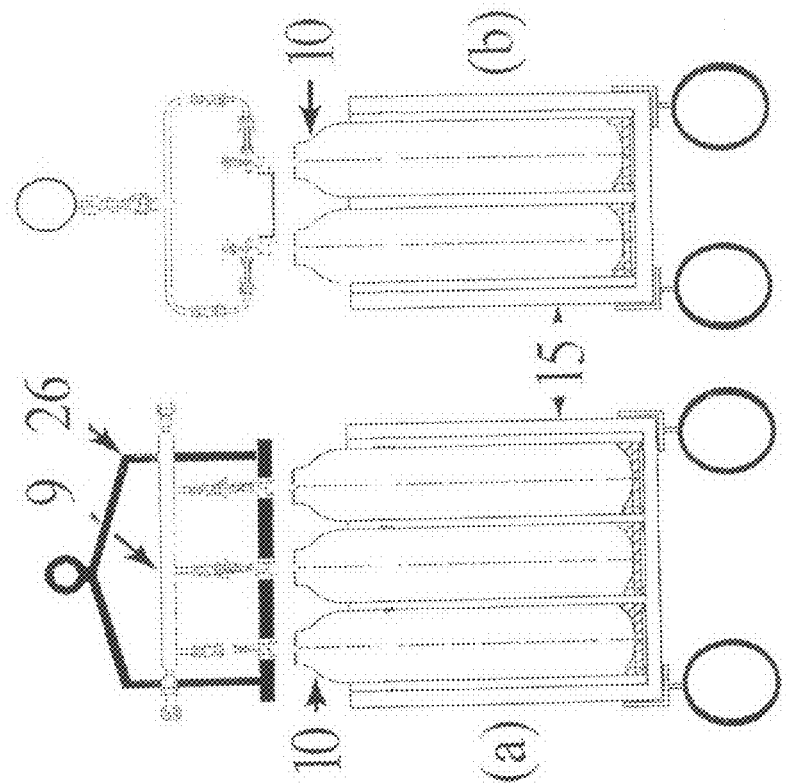
FIGS. 2a and 2b are schematic views of an alternative arrangement for a large extraction module according to a preferred embodiment of the present invention.

In FIG. 1, the extraction module 9 is shown as including a single cylinder (vessel) 10 having an associated pressure gauge 11. Common cylinder sizes include 10, 25 and 50 kg capacity cylinders which themselves have a mass approximately equal to the mass of gas they can hold. However, where a large amount of gas is to be extracted, the extraction module 9 will require greater capacity. FIGS. 2a and 2b show an alternative arrangement for the extraction module 9 wherein a plurality of cylinders 10 are manifolded together by a yolk 26. In this alternative arrangement, the valves of each cylinder 10 are turned to the same setting. It will be appreciated that the modular nature of this alternative arrangement, would allow assembly in various configurations as required. Tests have shown that extraction modules of up to 400 kg (eight manifolded 50 kg cylinders) are of sufficient practical capacity for many applications and have met functional expectations.

To initiate potentially contaminated gas extraction, i.e. the first cryogenic pumping step, the cylinder 10 of the extraction module 9 is immersed in a liquid nitrogen bath 15. The liquid nitrogen reduces the temperature of the extraction cylinder 10 to very low temperatures, at which $SF_6$ would be caused to condense inside the extraction cylinder 10. The pressure inside extraction cylinder 10 drops, thereby creating a very strong pumping effect between the extraction module and the potentially contaminated gas source and causing the potentially contaminated gas to flow from its source into the extraction module 9.

Once the extraction process is complete the pressure in each cylinder 10 will be less than approximately 0.1 kPa (around 1 Torr) depending upon the amount of time allowed for extraction and the amount of non-condensable gases (such as air) present as impurities.

If, following extraction of the potentially contaminated gas, recovery of $SF_6$ is not immediately required, then the process can be paused at this point. The extraction module 9 can be sealed, or each cylinder 10 can be sealed, and then disconnected from the system and stored until required for recovery processing at a later time. In a leakage situation, other maintenance work on the high voltage apparatus may have a higher priority than the actual recovery process.

Preferably, once the extraction process is completed, the system is then used for subsequent recovery of re-usable $SF_6$. The first step in the recovery process is the removal of non-condensed contaminants (e.g. air and $CF_4$) from the extraction module 9 and cylinder 10. Turning to FIG. 1, valves 16, 17, and the sampling cylinder 6 valves are closed. Valves 18, 19 and 24 are opened and a vacuum pump 20 is connected to valve 24. The non-condensed contaminants are then pumped out of the extraction module 9 and cylinder 10 leaving condensed $SF_6$ and any condensed contaminants behind in cylinder 10.

For high voltage equipment installed in very cold climates it has been found to be an advantageous practice to mix significant amounts of $CF_4$ with $SF_6$ to meet the requirements of the high voltage electrical application. It would be possible to separately recover any $CF_4$, removed above, for re-use by taking advantage of the saturated vapour properties of $CF_4$ in using a technique of partial distillation.

Once the non-condensed contaminants have been removed, the second cryogenic pumping step can be initiated to recover a re-usable grade of $SF_6$ into recovery module 21. In FIG. 1, the recovery module 21 is shown as including a single cylinder (vessel) 22 having an associated pressure gauge 23. However, like the extraction module 9, the recovery module 21 could be a plurality of cylinders manifolded together.

To initiate the second cryogenic pumping step, extraction cylinder 10 is removed from its liquid nitrogen bath 15 and recovery module cylinder 22 is immersed in its liquid nitrogen bath 25. In practice, it would be possible, although less convenient, to use only the one liquid nitrogen bath.

When the extraction cylinder 10 is removed from its liquid nitrogen bath 15, the pressure in the extraction cylinder 10 will rise as ambient temperature heating raises its temperature. Additional heating means, not shown, could be used to accelerate the rate of heating.

With only condensable vapours present in the extraction module 9, the pressure in the extraction cylinder 10 can be used as an indication of its temperature. When the pressure in the extraction cylinder 10 has reached around 830 kPa, the contents of the extraction cylinder 10 will have a dewpoint temperature of around −16° C. At this dewpoint temperature, the transferred $SF_6$ will be in gaseous form and only an insignificant amount of the condensed contaminants (e.g. water and oil) will be in vapour form. This has been found to be a re-usable grade of $SF_6$ gas in terms of the dewpoint requirements of IEC 60480. A minimum practical dewpoint using the cryogenic technology would be around −70° C. which exceeds the values specified for new gas and is readily achievable.

Maintaining this pressure in the extraction cylinder 10 and connecting the recovery module 21, while cylinder 22 is immersed in its liquid nitrogen bath 25, will create a pumping effect between the extraction cylinder 10 and the recovery module cylinder 22 causing the re-usable grade of $SF_6$ gas to flow into the recovery module 21. Turning to FIG. 1, this flow can be made direct by closing all the valves in the system with the exception of valve 18. However, optionally, the flow can be directed via a chemical filtering module 27, to remove additional chemically active contaminants from the gas flow, by opening valves 16 and 17 instead of valve 18. The chemical filtering module 27 will preferably use known chemical filtering means such as those recommended in IEC 60480.

If output sampling is required, ie in order to test the purity of the recovered $SF_6$, the sampling module 6 could be connected between the recovery module 21 and the chemical filtering module 27

It will be appreciated that many modifications can be made to the form of the system described above subject to falling within the scope of the annexed claims. For example, alternative coolants to liquid nitrogen can be employed which provide suitable cryogenic temperatures. Similarly, other cooling means which provide suitable cryogenic temperatures could be employed rather than a coolant bath. Further filtering modules or alternative filtering modules could be encompassed within the system depending upon the amount and types of contaminants present or expected to be present in a given situation.

The invention claimed is:

1. A system for recovering a re-usable grade of sulphur hexafluoride from a potentially contaminated gas present in a sulphur hexafluoride gas source, said system comprising:

at least one extraction vessel including a gas inlet and a gas outlet, said gas inlet being adapted to be connected to said sulphur hexafluoride gas source;

a first cryogenic means for reducing the temperature of said at least one extraction vessel to a temperature below phase transition of sulphur hexafluoride gas, wherein at said cryogenically reduced temperature the pressure in said at least one extraction vessel is less than the sulphur hexafluoride gas source pressure thereby causing said potentially contaminated gas to enter said at least one vessel via said gas inlet, the sulphur hexafluoride included in said potentially contaminated gas turning into liquid and/or solid form in said at least one extraction vessel;

evacuation means for evacuating any non-condensed contaminant gas from said at least one extraction vessel via said gas outlet while said at least one extraction vessel is at said cryogenically reduced temperature;

means for raising the temperature of said at least one extraction vessel from said cryogenically reduced temperature to substantially a dewpoint temperature after evacuating said non-condensed gas, wherein at said dewpoint temperature a re-usable grade of sulphur hexafluoride gas is present in said at least one extraction vessel and any condensable contaminants are in liquid and/or solid form, and wherein raising the temperature substantially to the dewpoint temperature raises the pressure in the at least one extraction vessel;

at least one recovery vessel including a gas inlet being adapted to be connected to said gas outlet of said at least one extraction vessel; and a second cryogenic means for reducing the temperature of said at least one recovery vessel to a temperature below phase transition of sulphur hexafluoride, wherein at said cryogenically reduced temperature the pressure in said at least one recovery vessel is less than the pressure in said at least one extraction vessel when substantially at said dewpoint temperature, wherein connecting the gas inlet of said at least one recovery vessel to the gas outlet of said at least one extraction vessel allows said re-usable grade of sulphur hexafluoride to enter said at least one recovery vessel, wherein the system is capable of flowing gas from the at least one extraction vessel to the at least one recovery vessel, the flow of gas being outside of the sulphur hexafluoride gas source, wherein the second cryogenic means is in addition to the first cryogenic means.

2. The system according to claim 1, wherein said first cryogenic means is a liquid nitrogen bath in which said at least one extraction vessel is immersed.

3. The system according to claim 1, wherein said second cryogenic means is a liquid nitrogen bath in which said at least one recovery vessel is immersed.

4. The system according to claim 1, wherein said evacuation means includes a vacuum pump.

5. The system according to claim 1, further including a storage vessel for capturing said evacuated non-condensed contaminant gas.

6. The system according to claim 1, wherein said evacuated non-condensed contaminant gas includes carbon tetra-fluoride ($CF_4$), said system further including means for extracting said $CF_4$ from said evacuated non-condensed contaminant gas.

7. The system according to claim 6, wherein said means for extracting said $CF_4$ from said evacuated non-condensed contaminant gas employs a technique of partial distillation.

8. The system according to claim 1, wherein said means for raising the temperature of said at least one extraction vessel includes heating means.

9. The system according to claim 2, wherein said means for raising the temperature of said at least one extraction vessel includes means for removing said at least one extraction vessel from said liquid nitrogen bath.

10. The system according to claim 1, further including sampling means, arranged between said potentially contaminated gas source and the gas inlet of said at least one extraction vessel, for selectively collecting a sample of said potentially contaminated gas while entering said at least one extraction vessel.

11. The system according to claim 1, further including chemical filtering means, arranged between the gas inlet of said at least one extraction vessel and the gas inlet of said at least one recovery vessel, for selectively removing further impurities from said re-usable grade of sulphur hexafluoride while entering said at least one recovery vessel from said at least one extraction vessel.

12. The system according to claim 1, wherein the pressure in said at least one extraction vessel at said cryogenically reduced temperature is substantially 0.1 kPa.

13. The system according to claim 1, wherein said dewpoint temperature is approximately −40° C. and the pressure in said at least one extraction vessel substantially at said dewpoint temperature is approximately 350 kPa.

14. A method for recovering a re-usable grade of sulphur hexafluoride from a potentially contaminated gas present in a sulphur hexafluoride gas source, said method comprising:

cryogenically reducing the temperature of at least one extraction vessel to a temperature below phase transition of sulphur hexafluoride gas by immersing said at least one extraction vessel in a first liquid nitrogen bath, wherein at said cryogenically reduced temperature the pressure in said at least one extraction vessel is less than the sulphur hexafluoride gas source;

fluidly connecting said at least one extraction vessel with the sulphur hexafluoride gas source and allowing said potentially contaminated gas to enter said at least one extraction vessel due to the pressure difference between the at least one extraction vessel and the sulphur hexafluoride gas source, the sulphur hexafluoride included in said potentially contaminated gas turning into liquid and/or solid form in said at least one extraction vessel;

evacuating any non-condensed contaminant gas from said at least one extraction vessel while said at least one extraction vessel is at said cryogenically reduced temperature;

raising the temperature of said at least one extraction vessel from said cryogenically reduced temperature to substantially a dewpoint temperature, wherein at said dewpoint temperature a re-usable grade of sulphur hexafluoride gas is present in said at least one extraction vessel and any condensable contaminants are in liquid and/or solid form, and wherein raising the temperature substantially to the dewpoint temperature raises the pressure in the at least one extraction vessel;

cryogenically reducing the temperature of at least one recovery vessel to a temperature below phase transition of sulphur hexafluoride gas by immersing said at least one recovery vessel in a second liquid nitrogen bath which is in addition to the first liquid nitrogen bath, wherein at said cryogenically reduced temperature the pressure in said at least one recovery vessel is less than the pressure in said at least one extraction vessel when substantially at said dew point temperature; and fluidly connecting said at least one recovery vessel with the at least one extraction vessel, said fluid connection occurring outside of the sulphur hexafluoride gas source, and wherein said re-usable grade of sulphur hexafluoride gas present in said at least one extraction vessel enters said at least one recovery vessel due to the pressure difference between the at least one recovery vessel and the at least one extraction vessel.

15. The method according to claim 14, wherein said evacuating step includes vacuum pumping any non-condensed contaminant gas from said at least one extraction vessel.

16. The method according to claim 14, further including capturing any evacuated non-condensed contaminant gas for storage.

17. The method according to claim 14, wherein said evacuated non-condensed contaminant gas includes carbon tetrafluoride ($CF_4$), said method further including extracting said $CF_4$ from said evacuated non-condensed contaminant gas.

18. The method according to claim 17, wherein said step of extracting said $CF_4$ from said evacuated non-condensed contaminant gas is conducted employing a technique of partial distillation.

19. The method according to claim 14, wherein said step of raising the temperature of said at least one extraction vessel includes using heating means.

20. The method according to claim 14, wherein said step of raising the temperature of said at least one extraction vessel includes removing said at least one extraction vessel from said liquid nitrogen bath.

21. The method according to claim 14, further including the step of collecting a sample of said potentially contaminated gas while said potentially contaminated gas enters said at least one extraction vessel.

22. The method according to claim 14, further including the step of chemically filtering said re-usable grade of sulphur hexafluoride gas while said sulphur hexafluoride gas enters said at least one recovery vessel.

23. A system for recovering a re-usable grade of sulphur hexafluoride from a potentially contaminated gas present in a sulphur hexafluoride gas source, comprising:
at least one extraction vessel including a gas inlet and a gas outlet, said gas inlet being adapted to be connected to said sulphur hexafluoride gas source;
a first liquid nitrogen bath for reducing the temperature of said at least one extraction vessel to a temperature below phase transition of sulphur hexafluoride gas, wherein at said cryogenically reduced temperature the pressure in said at least one extraction vessel is less than the sulphur hexafluoride gas source pressure thereby causing said contaminated gas to enter said at least one vessel via said gas inlet, the sulphur hexafluoride included in said contaminated gas turning into liquid and/or solid form in said at least one extraction vessel;
wherein the gas outlet is capable of evacuating any non-condensed contaminant gas from said at least one extraction vessel while said at least one extraction vessel is at said cryogenically reduced temperature;
wherein removal of said extraction vessel from said first liquid nitrogen bath is effective to raise the temperature of said at least one extraction vessel from said cryogenically reduced temperature to substantially a dewpoint temperature after evacuating said non-condensed gas, wherein at said dewpoint temperature a re-usable grade of sulphur hexafluoride gas is present in said at least one extraction vessel and any condensable contaminants are in liquid and/or solid form, and wherein raising the temperature substantially to the dewpoint temperature raises the pressure in the at least one extraction vessel;
at least one recovery vessel including a gas inlet being adapted to be connected to said gas outlet of said at least one extraction vessel; and
a second liquid nitrogen bath, which is in addition to the first liquid nitrogen bath, for reducing the temperature of said at least one recovery vessel to a temperature below phase transition of sulphur hexafluoride, wherein at said cryogenically reduced temperature the pressure in said at least one recovery vessel is less than the pressure in said at least one extraction vessel when substantially at said dewpoint temperature, wherein connecting the gas inlet of said at least one recovery vessel to the gas outlet of said at least one extraction vessel allows said re-usable grade of sulphur hexafluoride to enter said at least one recovery vessel,
wherein the system is capable of flowing gas from the at least one extraction vessel to the at least one recovery vessel, the flow of gas being outside of the sulphur hexafluoride gas source.

24. The system according to claim 1, comprising a plurality of valves capable of allowing gas to flow from the extraction vessel to the recovery vessel without passing through the potentially contaminated gas source.

25. The system according to claim 23, comprising a plurality of valves capable of allowing gas to flow from the extraction vessel to the recovery vessel without passing through the potentially contaminated gas source.

26. The system according to claim 1, wherein the first cryogenic means comprises a first liquid nitrogen bath, and the second cryogenic means comprises a second liquid nitrogen bath.

27. The method according to claim 14, wherein the step of cryogenically reducing the temperature of at least one extraction vessel is conducted with a first liquid nitrogen bath, and the step of cryogenically reducing the temperature of at least one recovery vessel is conducted with a second liquid nitrogen bath that is in addition to the first liquid nitrogen bath.

28. The method according to claim 14, wherein the step of raising the temperature of said at least one extraction vessel from said cryogenically reduced temperature to substantially a dewpoint temperature, consists of ambient temperature heating.

29. The system according to claim 1, wherein the sulphur hexafluoride gas source is a circuit breaker.

30. The method according to claim 14, wherein the sulphur hexafluoride gas source is a circuit breaker.

31. The system according to claim 23, wherein the sulphur hexafluoride gas source is a circuit breaker.

32. The system according to claim 29, wherein the at least one extraction vessel and the at least one recovery vessel are in fluid connection with the circuit breaker via the same gas inlet.

33. The method according to claim 30, wherein the at least one extraction vessel and the at least one recovery vessel are in fluid connection with the circuit breaker via the same gas inlet.

34. The system according to claim 31, wherein the at least one extraction vessel and the at least one recovery vessel are in fluid connection with the circuit breaker via the same gas inlet.

\* \* \* \* \*